(12) United States Patent
Hsieh

(10) Patent No.: US 6,480,914 B1
(45) Date of Patent: Nov. 12, 2002

(54) METHOD FOR SUPPORTING USB INPUT DEVICES VIA BIOS

(75) Inventor: An Pang Hsieh, Taipei (TW)

(73) Assignee: Inventec Corporation, Taipei (TW)

( * ) Notice: Subject to any disclaimer, the term of this patent is extended or adjusted under 35 U.S.C. 154(b) by 0 days.

(21) Appl. No.: 09/511,096

(22) Filed: Feb. 23, 2000

(51) Int. Cl.⁷ .............................................. G06F 13/12
(52) U.S. Cl. ........................... 710/73; 710/15; 710/62; 710/64; 710/306
(58) Field of Search ............................. 710/73, 15, 17, 710/62, 64, 65, 306, 313

(56) References Cited

U.S. PATENT DOCUMENTS

| | | | | |
|---|---|---|---|---|
| 5,802,318 A | * | 9/1998 | Murray et al. ................. 703/25 |
| 5,896,534 A | * | 4/1999 | Pearce et al. .................. 710/17 |
| 5,991,546 A | * | 11/1999 | Chan et al. ................... 710/313 |
| 6,067,589 A | * | 5/2000 | Mamata ........................ 710/15 |
| 6,119,194 A | * | 9/2000 | Miranda et al. ............. 710/306 |
| 6,216,183 B1 | * | 4/2001 | Rawlins ....................... 710/100 |
| 6,298,399 B1 | * | 10/2001 | Martwick ................... 710/100 |
| 6,370,598 B1 | * | 4/2002 | Martwick ................... 710/100 |

* cited by examiner

Primary Examiner—Jeffrey Gaffin
Assistant Examiner—Harold Kim
(74) Attorney, Agent, or Firm—Birch, Stewart, Kolasch & Birch, LLP

(57) ABSTRACT

A method for supporting USB input devices via BIOS, which allows BIOS to support USB input devices when the motherboard does not have the keyboard controller (KBC). This method is especially applied to the operating systems that do not support the drivers for USB keyboard and mouse input devices, and BIOS can still support existing USB keyboard and mouse input devices. It is implemented by connecting two general purpose output pins of a south bridge (SB) on the hardware to an 8259 programmable interrupt controller (PIC) chip on the SB and revising some part of the internal program in BIOS to simulate and create hardware interruption requests IRQ1 and IRQ12. This can achieve the object of backward compatibility. and support usual chipsets on the market by merely revising the firmware.

7 Claims, 2 Drawing Sheets

METHOD FOR SUPPORTING USB INPUT DEVICES VIA BIOS

BACKGROUND OF THE INVENTION

1. Field of the Invention

This invention relates to a method for supporting USB input devices via BIOS and, in particular, to a method for the operating systems, which do not support USB keyboard and mouse input devices, to support existing USB keyboards and. mouse input devices under a PC structure without the keyboard controller (KBC).

2. Related Art

In general, when a computer starts, there are some management procedures in the booting process, namely, the basic input output system (BIOS), such as the power-on selftest (POST), low level hardware setting for the disk: drives, keyboard, and monitor. It also provides some service routines for the firmware in the computer to control hardware. Nowadays, BIOS is stored in electrically erasable programmable read only memory (EEPROM) or erasable programmable read only memory (EPROM) to allow the user to renew internal data, in a proper time.

Currently, the keyboard controller (KBC) in usual PC structure is in a super I/O chipset. When BIOS supports the USB keyboard and mouse input devices, the system has to rely on the KBC on the super I/O chipset. An I/O port with the address 60$h$ is on the KBC. When 60$h$ is input with data, hardware interrupt requests IRQ1 or IRQ12 will be created so as to call the service routines for IRQ1 and IRQ12. However, for the Free PC proposed under the consideration of increasing the efficiency and decreasing the price, a super I/O chipset with only about 8 MHz industrial standard architect (ISA) is taken off and replaced by a USB controller with a 33 MHz peripheral component interface (PCI) structure as the KBC. Therefore, it does not only lower the cost, but also increases the efficiency from 8 MHz to 33 MHz, a factor of more than 4. At this moment, one has to use USB keyboards and mice to, replace conventional PC PS/2 keyboards and mice. The current BIOS would not be able to support them under the operating system because there is no address 60$h$ on the KBC to send out IRQ1 and IRQ12.

In addition, if one wants to directly use USB keyboard and mouse service routines in BIOS to support USB keyboard and mouse, a great portion of the BIOS code has to be revised. This may cause some potential problems in BIOS and it does not support all operating systems, such as Windows NT 4.0. Thus, the problem that needs to be solved is: how BIOS supports USB keyboard and mouse input devices without the super I/O controller in the computer.

SUMMARY OF THE INVENTION

A main object of the instant invention is to provide a method for supporting USB input devices via BIOS when there is no keyboard controller on the motherboard. This method is especially applied to the operating systems that do not support USB keyboard-and mouse input devices and to the motherboards that do not have keyboard controller. These systems can use available USB keyboard and mouse input devices to achieve the object of backward compatibility. This method supports usual chipsets on the market with some modification on the firmware only.

The method for supporting USB input devices via BIOS disclosed in this specification allows the motherboards that do not have keyboard controller to use USB keyboard and mouse input devices. The method comprises the steps of:

setting the USB interrupt as the system management interrupt (SMI) while POST initializes the USB controller, and creating SMI from the I/O of addresses 60$h$ and 64$h$;

creating system management interrupt when the user presses a USB keyboard or moves a USB mouse and entering the USB service routine in system management memory (SMM);

getting input data from the USB keyboard and mouse input devices and judging the data source;

translating the input data into the legacy keyboard or mouse data according to the data source so that the service routines or drivers for IRQ1 and IRQ12 can correctly read legacy data;

creating a corresponding hardware interruption requests IRQ1 or IRQ12 by connecting general purpose output pins of a south bridge to an 8259 programmable interrupt controller chip on the south bridge;

creating a system management interrupt (SMI) signal and entering the USB service routine in the SMM when the service routine or driver of the keyboard or mouse gets the conventional keyboard or mouse data through the address 60$h$;

de-asserting the general purpose output pins and thus IRQ1 or IRQ12; and storing the translated legacy data into an al register stack in the CPU state saved area in the SMM; and determining whether there is any data pending, and going to the step of creating corresponding hardware interruption requests by connecting general purpose output pins if there is or ending if there is not.

By connecting two general purpose output pins of the south bridge to an 8259 programmable interrupt controller chip on the SB and modifying part of the internal USB service routine of the BIOS accordingly to simulate the generation of hardware interruption requests IRQ1 and IRQ12, the system can translate USB keyboard or mouse data into the legacy ones for the keyboard or mouse service routine or driver without affecting the operation of the operating system.

In this manner, one only needs to modify the firmware without increasing the cost on the hardware to support the usage of the keyboard and mouse when there is no KBC. This method is particularly useful in the operating system that does not support USB keyboard and mouse input devices.

Further scope of applicability of the present invention will become apparent from the detailed description given hereinafter. However, it should be understood that the detailed description and specific examples, while indicating preferred embodiments of the invention, are given bye way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow illustration only, and thus are not limitative of the present invention, and wherein.

DETAILED DESCRIPTION OF THE INVENTION

In the process of universal series bus controller initialization and before the test for the keyboard and mouse, the access addresses 60*h* and 64*h* and the function of creating a system management interrupt (SMI) signal by the USB hardware interruption are turned on first.

Figure 1:
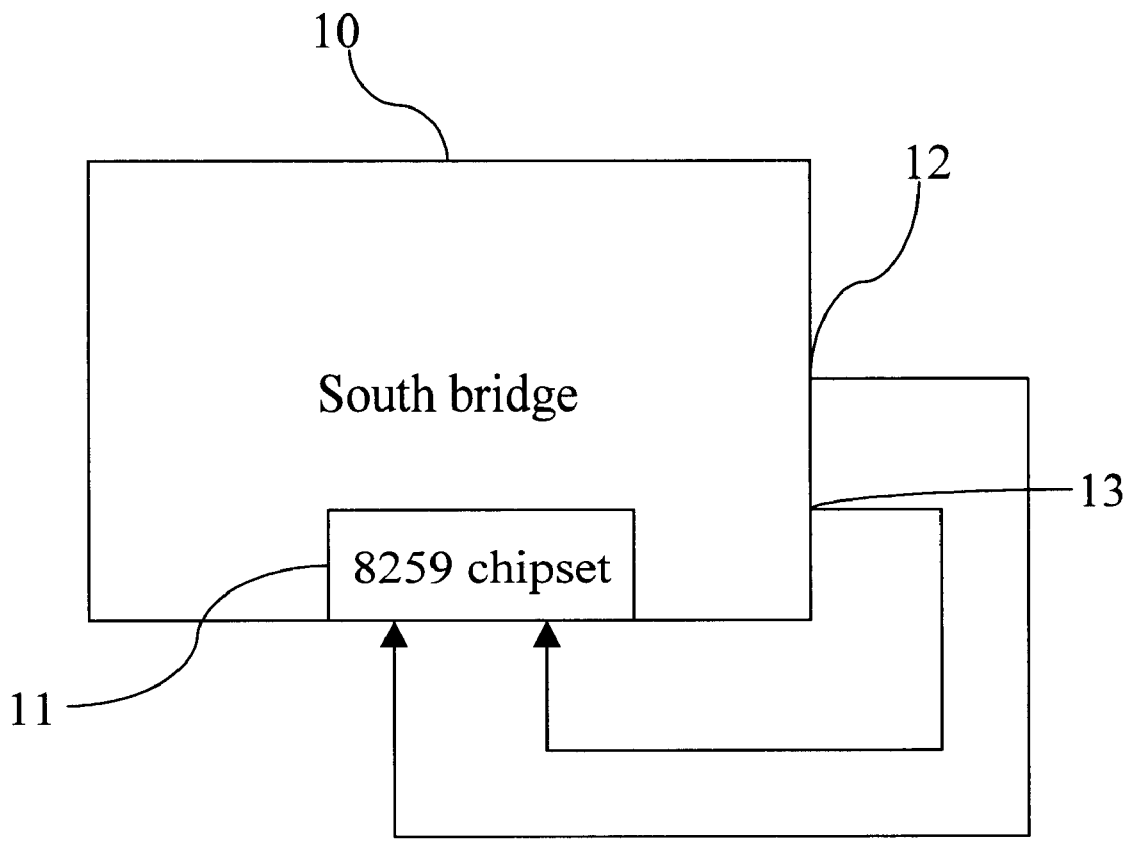
FIG. 1 shows hardware circuit of the present invention.

Please refer to FIG. 1, which shows hardware circuit of the present invention. To achieve the goal of supporting USB keyboards and mice when there is no keyboard controller (KBC), the present invention connects two general purpose output pins A 12 and B 13 of a south bridge (SB) 10 to an 8259 programmable interrupt controller chip 11, a programmable interface controller (PIC), also on the SB 10. It creates interruption requests IRQ1 and IRQ12 according to the situation, but the default value is not to create any IRQ.

In the currently popular computer system (not shown), the central processing unit (CPU) connects to a north bridge (NB), which is a chipset, through a CPU bus. In addition to connecting memory (SDRAM, EDORAM, etc), the NB also connects to an AGP VGA card through an AGP bus. Moreover, the NB connects to the SB 10 via a PCI bus for transmitting data and messages. Aside from connecting to the hard disk drive (HDD), CD-ROM, DVD-ROM, USB, super I/O chipset for data access, the SB 10 further connects to BIOS and the audio device (such as a sound blaster card) via an XD bus and an ISA bus, respectively.

When BIOS sends a command to the addresses 60*h* and 64*h* to test the keyboard and keyboard controller, an error would occur while testing the keyboard for the Free PC because there is no KBC. However, the present invention creates-a system management interrupt signal that will be captured by the BIOS when any access action happens to the addresses 60*h* and 64*h*. Furthermore, the invention simulates the action of KBC so that the system would not create any error,message because no KBC is found.

Figure 2:
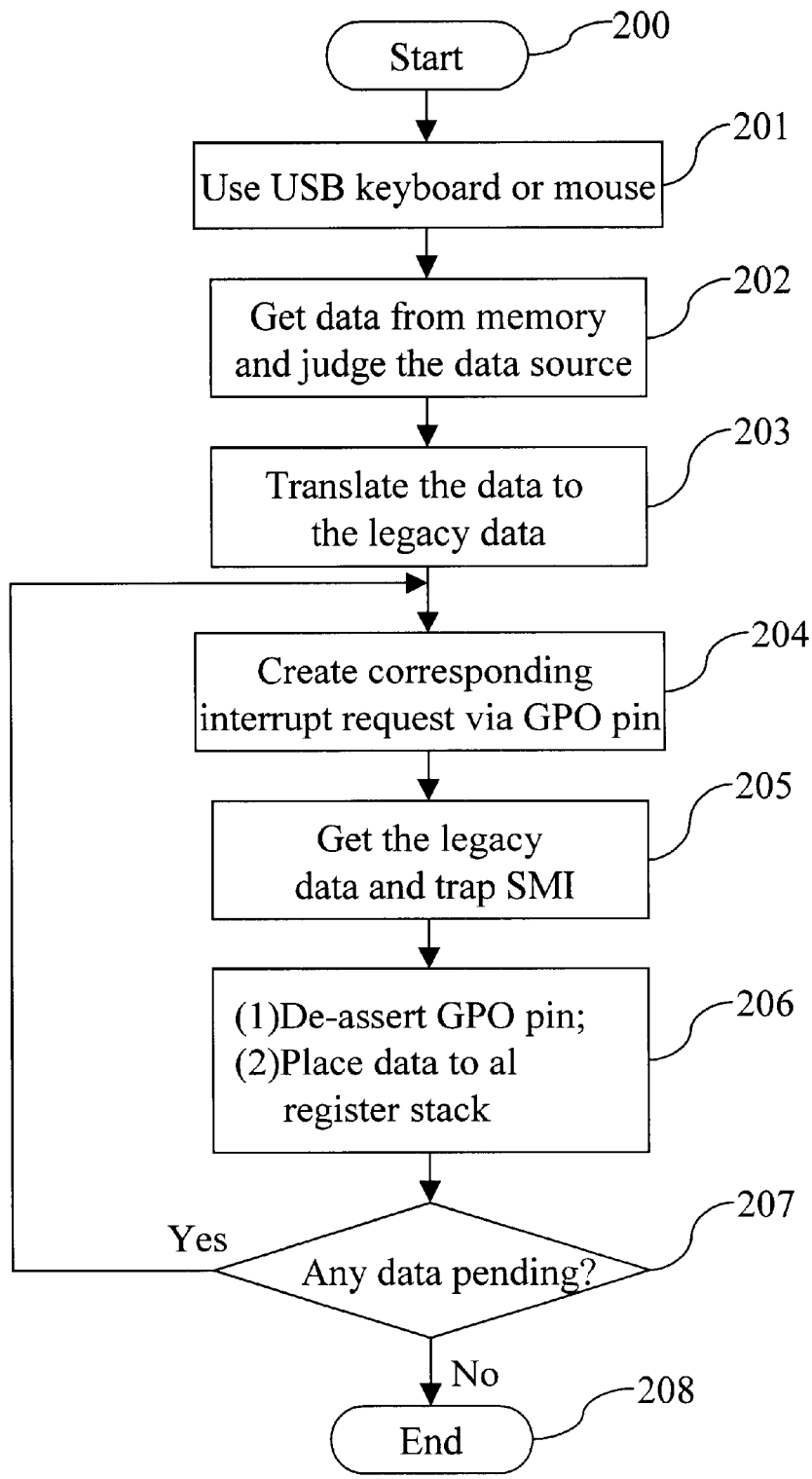
FIG. 2 is a flow chart of the method for supporting USB keyboard and mouse input devices via BIOS disclosed by the present invention.

Also as shown in FIG. 2, which is a flow chart of the method for supporting USB keyboard and mouse input devices via BIOS disclosed by the present invention, this method is used in an operating system that does not support USB input devices, such as the old DOS or Windows 3.1. In these operating systems, the user can still use the USB keyboard and mouse input devices by this method. When the user presses a USB keyboard or moves a USB mouse (steps 200 to 201), the system first creates a system management interrupt, then the steps include:

(1) getting input data from the USB keyboard or mouse input devices and placed in memory with a USB service routine and judging the input data source (step 202);

(2) translating the input data into the legacy ones via the USB service routine according to the input data source so that the IRQ1 or IRQ12 hardware interruption service routine and the keyboard or mouse driver provided. by the operating system can access the legacy data (step 203);

(3) connecting general purpose output pins, GPO pin A or GPO pin B on a south bridge (SB),to an 8259 programmable interrupt controller chip on the SB so as to create a corresponding hardware interruption request IRQ1 or IRQ12 (step 204);

(4) getting the legacy data with the service routine input address 60*h* of the input devices, creating system management interrupt (SMI) signals, and entering system management memory (SMM) (step 205);

(5) creating the following two actions by the USB service routine: 1. The system de-asserts the general purpose output pins, GPO pin A or GPO-pin B, and thus IRQ1 or IRQ12; and 2. The system puts the legacy data into a USB service routine via the SMI created by the program code of "in al,60*h*", and places translated data into an-al register stack address in the CPU state saved area in the SMM. When the SMI finishes, the register then stores the correct keyboard or mouse data for the interrupt service routine (step 206). When determining whether data in the address 60*h* have. been retrieved from the KBC state obtained via the program code "in al,64*h*", a SMI signal is also created and put into the vacant state of the simulation address 60*h* in the USB service routine. The data are placed in the register address in the CPU state saved area in the SMM. Therefore, when the SMI ends and the system goes back to the input device interrupt service routine, the service routine can get the correct KBC state data without errors due to the lack of KBC; and (6) determining if there is any data pending (step 207), and going to the step of connecting general purpose output pins and creating a corresponding hardware interruption request (step 204) if there is or ending if there is not (step 208).

When USB keyboard and mouse input devices are employed, the keyboard or mouse would send out an input data signal. After the transmission finishes, an interruption request would be created and put into a system management memory (SMM). After the USB service routine gets these data, the system determines whether the source is a keyboard code or a mouse code and translates them into the legacy ones. Before the action ends, the system sends out a command to the GPO pin A or GPO pin B according to the data source so as to create a corresponding IRQ1 or IRQ12 to call the keyboard or mouse service routine or drivers in the operating system (OS).

At this moment, when the keyboard or mouse service routine in the old OS gets data in the original addresses 60*h* or 64*h*, a SMI signal would be created for BIOS. Therefore, the translated legacy data are placed into the register in the CPU state saved area in the SMM. When the SMI finishes, the keyboard or mouse service routine gets the correct data to accomplish the simulation of creating a hardware interruption request IRQ1 or IRQ12. In the meantime, the GPO pin A or B is de-asserted to prevent the system from being unable to continue the next action.

In the above procedure, only two portions inside BIOS need to be modified: (1) creating a corresponding hardware interruption request IRQ1 or IRQ12 via the GPO pin A or B pursuant to the design of the hardware; and (2) de-asserting or creating the GPO pin A or B by the high/low (0/1) value thereof.

According to the aforementioned method, the USB keyboard and mouse data can be applied to the PC structure that does not have a KBC without modifying too much of the BIOS code and requiring specific hardware support.

According to the method for supporting USB keyboard and mouse input devices and systems without a KBC via the BIOS disclosed in this invention, the effects achieved are:

1. Current USB keyboard and mouse input devices can be used and the backward compatibility can be achieved in the OS that does not support USB keyboard and mouse input devices, such as DOS or Windows 3.1.

2. The system can support usual chipsets on the market by merely modifying the firmware without increasing any cost on the hardware, and the user would experience no change at all.

3. After getting rid of the super I/O controller, the execution efficiency of the system can be increased to four times that of usual computer systems. Thus, if the support of the operations under the old OS can be increased, there would be a wider application for the present invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for supporting USB input devices via BIOS for the operating system to be able to use the USB input devices when the motherboard does not have a keyboard controller (KBC), which method comprises the steps of:

creating a system management interrupt and entering system management memory when the user uses the USB input devices;

getting input data from the USB input devices and judging the input data source;

translating the input data into legacy data according to the input data source so that the service routine or OS driver can correctly read the legacy data;

connecting a general purpose output pin on a south bridge to an 8259 programmable interrupt controller (PIC) chip on the SB so as to create a corresponding hardware interruption request (IRQ), and entering the interrupt service routine when the SMI finishes;

getting the legacy data through the address 60$h$, creating the SMI and entering the SMM;

de-asserting the GPO pin and thus IRQ from the USB service routine, and placing the translated legacy data into an al register stack in the CPU state saved area in the SMM; and determining if there is any data pending, and going to the step of creating a corresponding hardware interruption request if there is or ending if there is not.

2. The method for supporting USB input devices via BIOS of claim 1, wherein the USB input device is a USB keyboard.

3. The method for supporting USB input devices via BIOS of claim 2, wherein the hardware interruption request created corresponding to the USB keyboard is IRQ1.

4. The method for supporting USB input devices via BIOS of claim 1, wherein the USB input device is a USB mouse.

5. The method for supporting USB input devices via BIOS of claim 4, wherein the hardware interruption request created corresponding to the USB mouse is IRQ12.

6. The method for supporting USB input devices via BIOS of claim 1, wherein the step of placing the translated legacy data into the register stack by the interrupt service routine is achieved with the program code "in 60$h$,al".

7. The method for supporting USB input devices via BIOS of claim 6, wherein the step of placing the translated legacy data into the register is followed by the step of obtaining the KBC state by the interrupt service routine, which is achieved with the program code "in 64$h$,al".

* * * * *